United States Patent [19]
Chiu et al.

[11] Patent Number: 4,667,301
[45] Date of Patent: May 19, 1987

[54] GENERATOR FOR PSEUDO-RANDOM NUMBERS

[75] Inventors: Sou-Hsiung J. Chiu, Eagan, Minn.; Yulu Qi, Pittsburgh, Pa.

[73] Assignee: Control Data Corporation, Minneapolis, Minn.

[21] Appl. No.: 504,091

[22] Filed: Jun. 13, 1983

[51] Int. Cl.$^4$ ............................................. G06F 1/02
[52] U.S. Cl. ....................................... 364/717; 380/46
[58] Field of Search ............... 178/22.16, 22.19, 22.11, 178/22.01, 22.14, 22.15; 364/900, 717

[56] References Cited

U.S. PATENT DOCUMENTS

| | | | |
|---|---|---|---|
| 3,639,690 | 2/1972 | Braun et al. | 178/22.19 |
| 3,780,275 | 12/1973 | Nakamura | 364/717 |
| 3,920,894 | 11/1975 | Shirley et al. | 364/717 |
| 3,986,168 | 10/1976 | Anderson | 364/717 |
| 4,032,764 | 6/1977 | Savage | 364/717 |
| 4,115,657 | 9/1978 | Morgan | 178/22.16 |
| 4,202,051 | 5/1980 | Davida et al. | 364/717 |
| 4,216,531 | 8/1980 | Chiu | 364/757 |
| 4,218,748 | 8/1980 | Goodwin | 364/717 |
| 4,291,386 | 9/1981 | Bass | 364/717 |
| 4,450,321 | 5/1984 | Quigley et al. | 178/22.19 |
| 4,493,046 | 1/1985 | Watanabe | 364/717 |

Primary Examiner—Salvatore Cangialosi
Assistant Examiner—Aaron J. Lewis
Attorney, Agent, or Firm—Joseph A. Genovese; William J. McGinnis

[57] ABSTRACT

Pseudo-random numbers (PRNs) have great importance in data processing and encryption. The standard technique for generating PRNs on computers at the present time involves software implementation of recursively computing $PRN_{n+1} = (PRN_n)(b) \bmod M$, in real number field which means that a relatively slow and involved multiplication must occur for each PRN, and each PRN calculation is strictly subsequent to previous PRM calculations. This disclosure shows a systolic multiplier implemented by a series of exclusive OR operations which generates simultaneously a new set of the PRN's from the current set of PRN's in parallel. The operation of multiplication mod M is performed over a finite field instead of a real number field. To facilitate the multiplication, the input operands are first transformed into a different representation that consists of more bits than that of the original ones. The operation of multiplication is then carried out in this transformed representation. The number of bits of the intermediate product is then reduced to that specified for each PRN through an inverse transform network, thereby forming a new PRN. The cheapness, speed, and simplicity of the required logic allows at least one PRN to be generated per computer cycle. If desired, several logic networks can be paralleled for simultaneous generation of multiple PRNs. This technique allows $PRN_{n+k}, \ldots$ to be generated directly from $PRN_n, \ldots$ where k is some proper integer.

1 Claim, 9 Drawing Figures

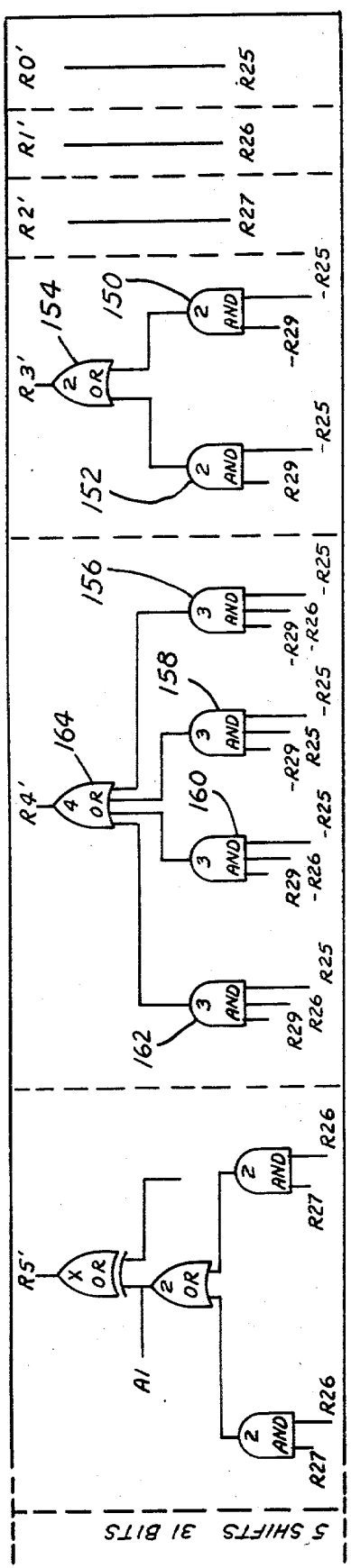
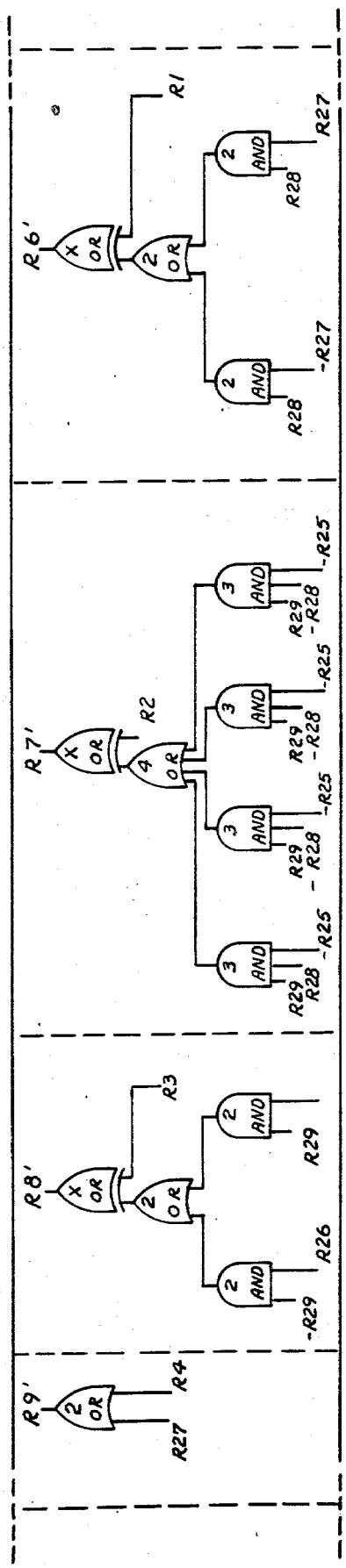
FIG. 2A

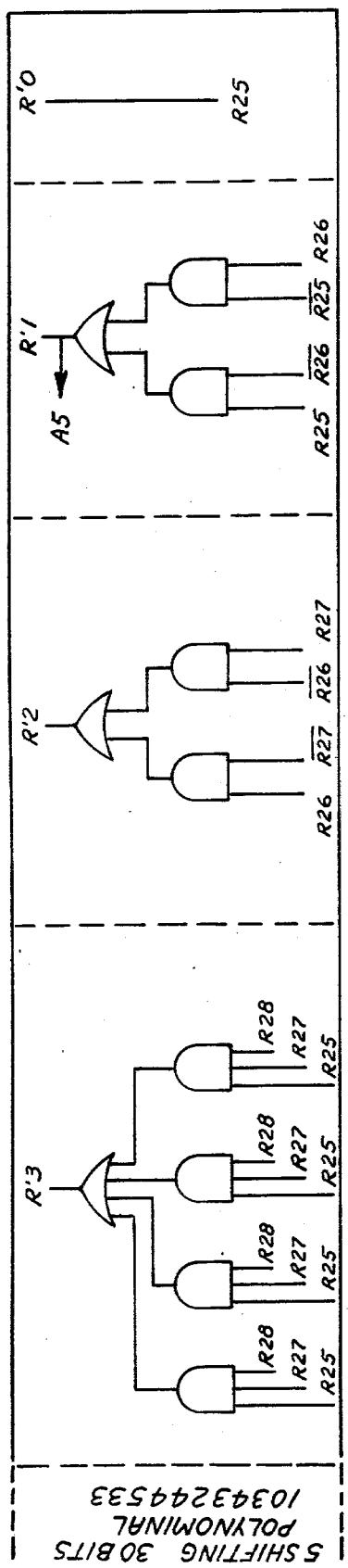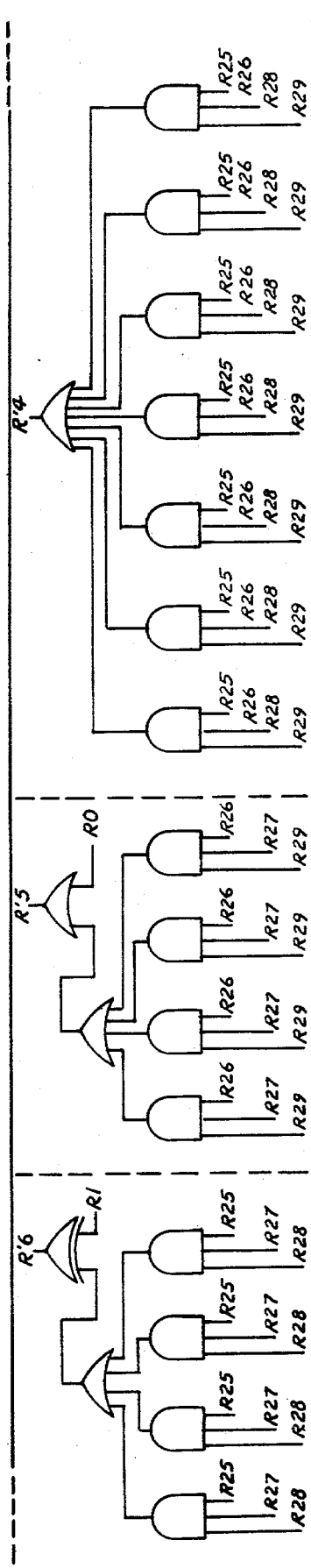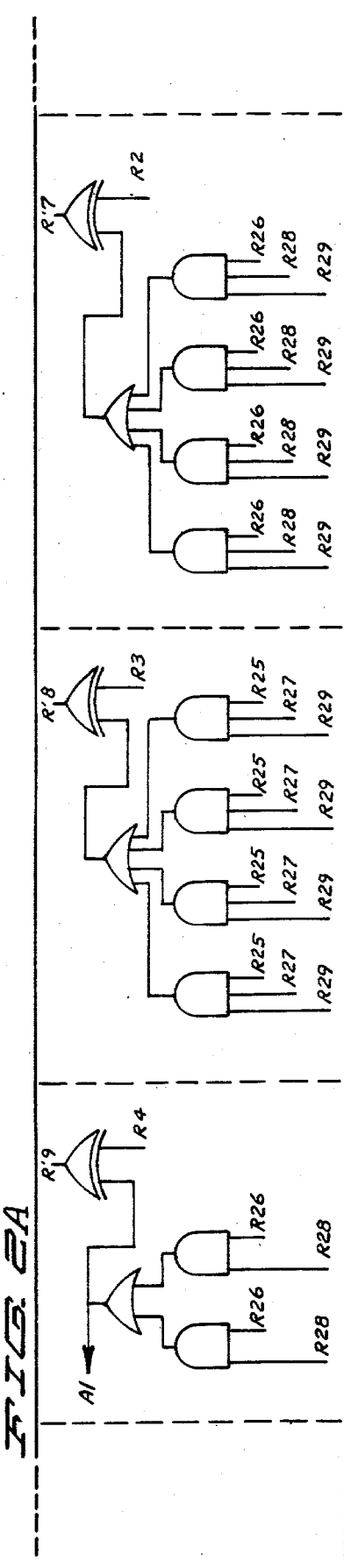
FIG. 2A

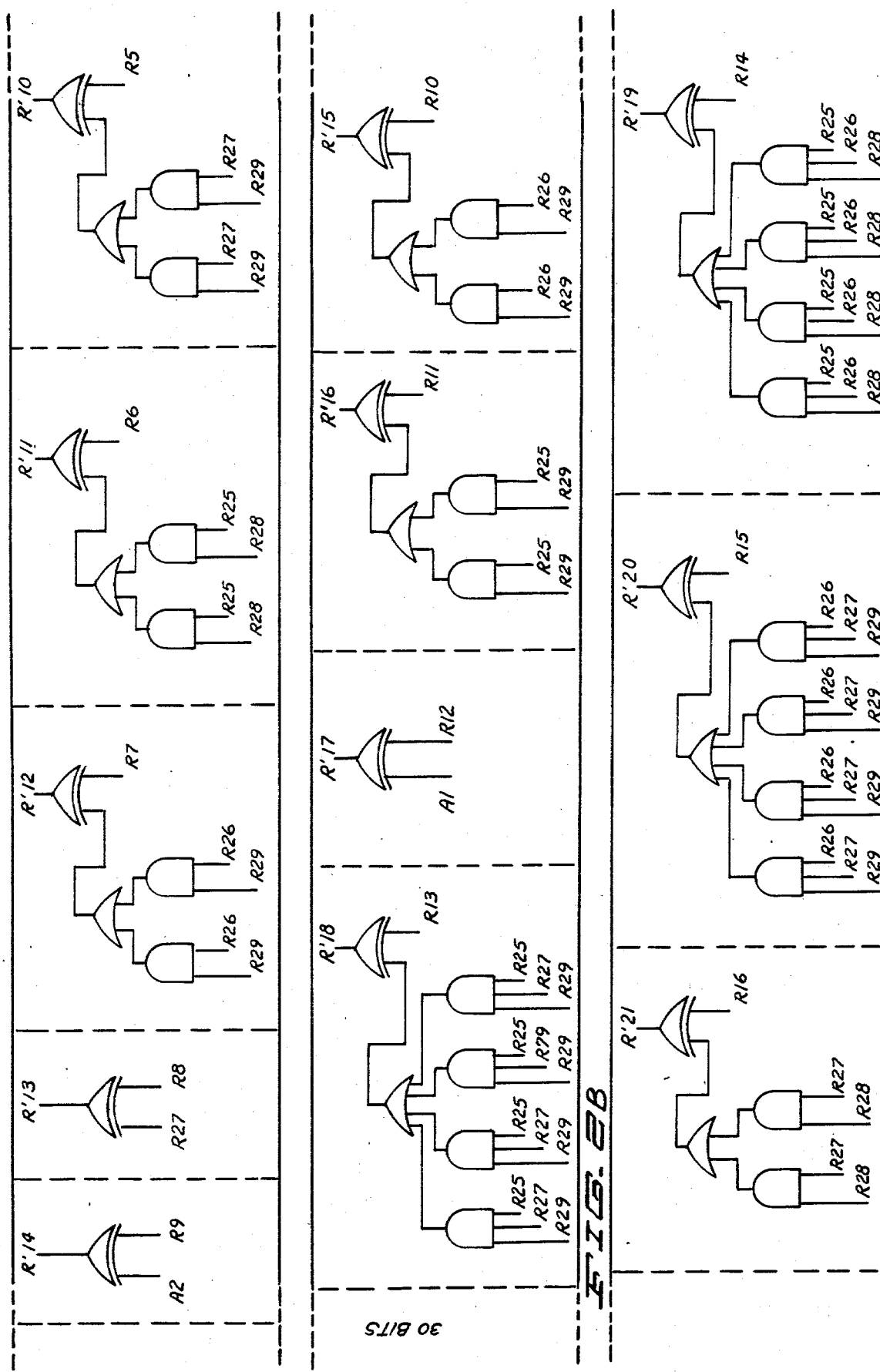

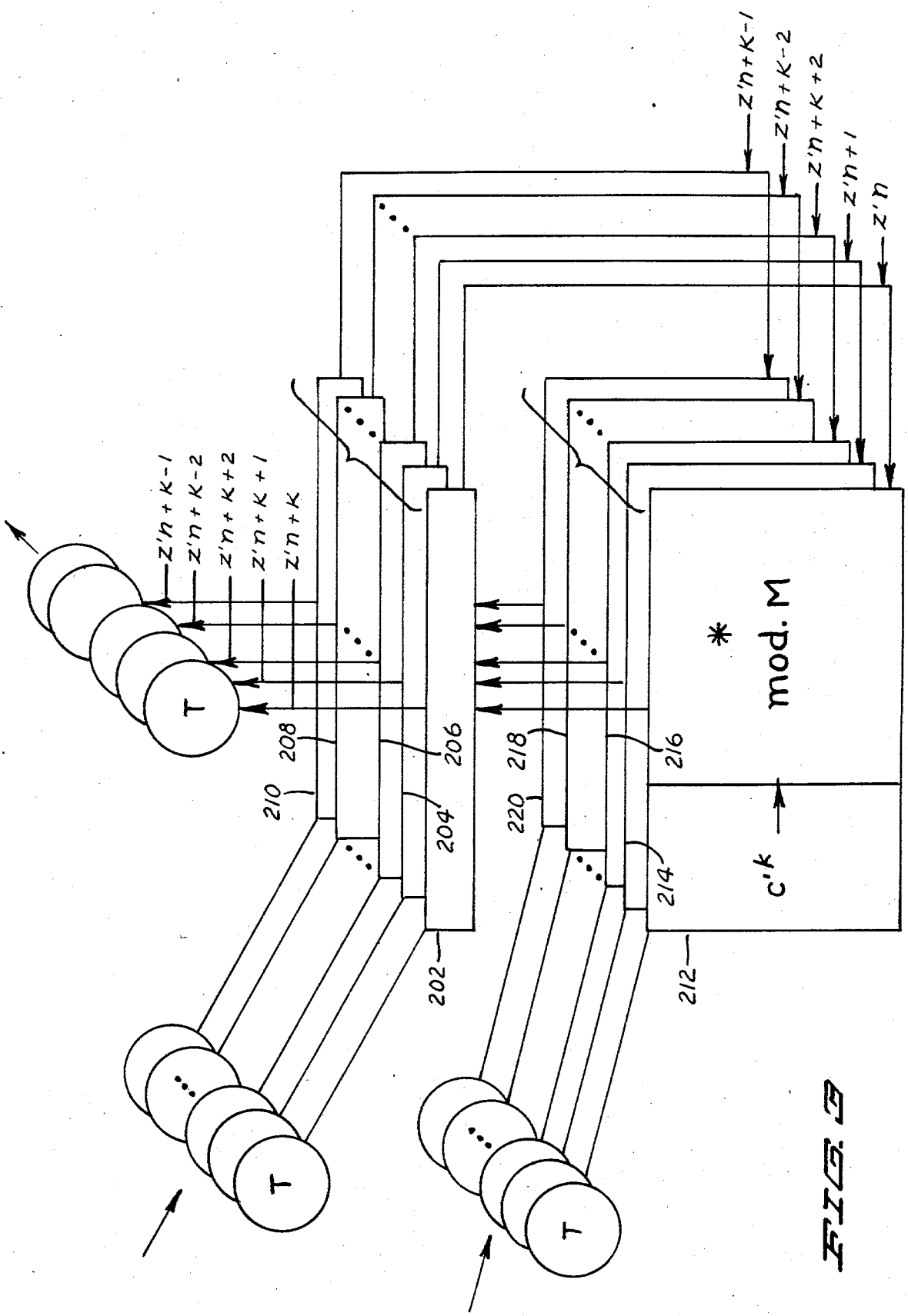

GENERATOR FOR PSEUDO-RANDOM NUMBERS

BACKGROUND OF THE INVENTION

This invention relates to pseudo-random number generators. This invention is a non-recursive generator of pseudo-random numbers.

In particular, the present invention employs a systolic multiplier in order to generate particular random numbers in a sequence of random numbers. These random numbers need not necessarily be generated in strictly sequential order one after another, and that is the reason for referring to this as a non-recursive generator of random numbers. Known to applicant in the prior art is U.S. Pat. No. 3,548,174, issued Dec. 15, 1970 to D. E. Knuth, which shows a random number generator based on a shift register where each successive random number is generated by a shift function of the shift register.

U.S. Pat. No. 4,264,781, issued Apr. 28, 1981, shows a pseudo-random number generator and describes implementation using a shift register and a feedback method to implement a particular primitive polynomial.

U.S. Pat. No. 4,202,051, issued May 6, 1980, shows a particular implementation of a shift register using linear feedback in order to implement a random number generator.

U.S. Pat. No. 4,218,749 shows another implementation of a shift register with feedback for implementing a pseudo-random number generator.

U.S. Pat. No. 3,986,168 issued Oct. 12, 1976 shows a pseudo-random number generator in which a shift register, having a small number of outputs, is provided with means for coupling to various combinational logic units so that multiple random bits may be generated and selected simultaneously.

None of this prior art directly anticipates the present invention which is based on a multiplication technique for generating pseudo-random numbers.

SUMMARY OF THE INVENTION

The present invention is based on a multiplication technique over a finite field for generating pseudo-random number(s) stored in a (set of) register. It has been learned that the technique for generating random numbers, using a shift register, does not generate random numbers of the high quality of randomness with only one or two iterations of the shifting process. Therefore, it has been learned that a relatively large no. of multiple shifts in a shift register using the shifting technique are required to generate a random number having a reasonable quality of randomness for those mathematical applications requiring true random numbers. In fact, it has been learned that the required number of shifts in a shift register, to accomplish the generation of random numbers of the highest possible quality, requires a number of iterations of the shifting process which is far greater than can be feasibly implemented in any direct fashion.

Therefore, the present invention provides for a random number generator using a multiplication technique over a finite field which generates high quality random numbers equivalent to that by a very high number of iterations of the shifting process using the shift register technique for generating random numbers. In the case where a relatively small no. of shifts is capable to satisfy an application we also provide a combinational logic that can accomplish the work of multiple sequential shift by one single operation.

This invention is concerned with a viable implementation on a computer and/or its peripherals to generate pseudo-random numbers, at high speed using parallelism when desired. These are called pseudo-random numbers because their generation results from certain deterministic processes to be described in detail later. They should be distinguished from those random numbers extracted from some physical processes of a random nature. The latter are not reproducible, while the former are. The reproducibility is often time deemed to be very important in many applications.

The use of random numbers has become so widespread that they not only play a vital role in encryption, but have also formed the basis of the quasi-Monte Carlo technique which has found its applicability to a never-ending variety of problems in numerical analysis, statistics, applied mathematics, particle physics, engineering, system analysis and so on.

Though there have been tables of random numbers as well as physical devices for generating random numbers such as white noise, an ever-expanding school of thought has persuaded people to select for sampling purposes random numbers according to some deterministic scheme well suited for the particular problem at hand. This trend has since given rise to the quasi-Monte Carlo method, a numerical method based on pseudo random numbers.

No computer of any reasonable power is a present known to be equipped with a hardware-implemented pseudo-random number generator available in the instruction repertoire. Rather, the generation of pseudo-random numbers is implemented with software as a library function. Let alone the system overhead, the computation called for is time consuming and the generation process is strictly recursive in nature. Even on some large-scale computers, this software implementation requires over 150 machine cycles to generate one single pseudo-random number.

The most commonly practiced algorithm has been the multiplicative congruential method on real number field as can be smmarized by, for PRN $Z_n$, $$Z_{n+1} = Z_n * b \bmod M \qquad \text{Equation (1)}$$

where b is a suitably pre-selected multiplicant and M is often chosen to be $2^s$ on an s-bit computer. The generation process is initiated with a starting number $Z_o$, also known as a seed. Here, the new n+1st, pseudo random number of the sequence is obtained from the previous, nth, element by multiplying it by multiplicant b and then having the result reduced modulo M. This multiplication in terms of the normal arithmetic is quite involved and takes several machine cycles even on the fastest computers. Furthermore, the number of bits doubles in every multiplication so that to compute ahead, say $Z_{n+2}$ from $Z_n$ directly with $b^2$ and so on, has seemed to be unthinkable on a computer with registers of limited width. With such a strictly recursive approach on a parallel super computer, a pseudo-random number vector can only provide the user an illusion as every element of each vector actually has to wait in turn to get through the recursion calculation sequentially one after another.

IN THE FIGURES

FIG. 1 is an embodiment of the present invention to achieve instant result of a shift register with a multiple but low no. of shifts, and is designated FIG. 1A and FIG. 1B covering two sheets of drawing.

FIG. 3 shows yet another embodiment of the present invention showing the parallel generation of multiple pseudo-random numbers per machine cycle in a multiprocessing mode.

FIG. 6 is a showing of a fully pipelined PRN generation according to one embodiment of the present invention for one PRN per cycle with modest amount of hardware.

DESCRIPTION OF THE PREFERRED EMBODIMENTS

Figure 2B:
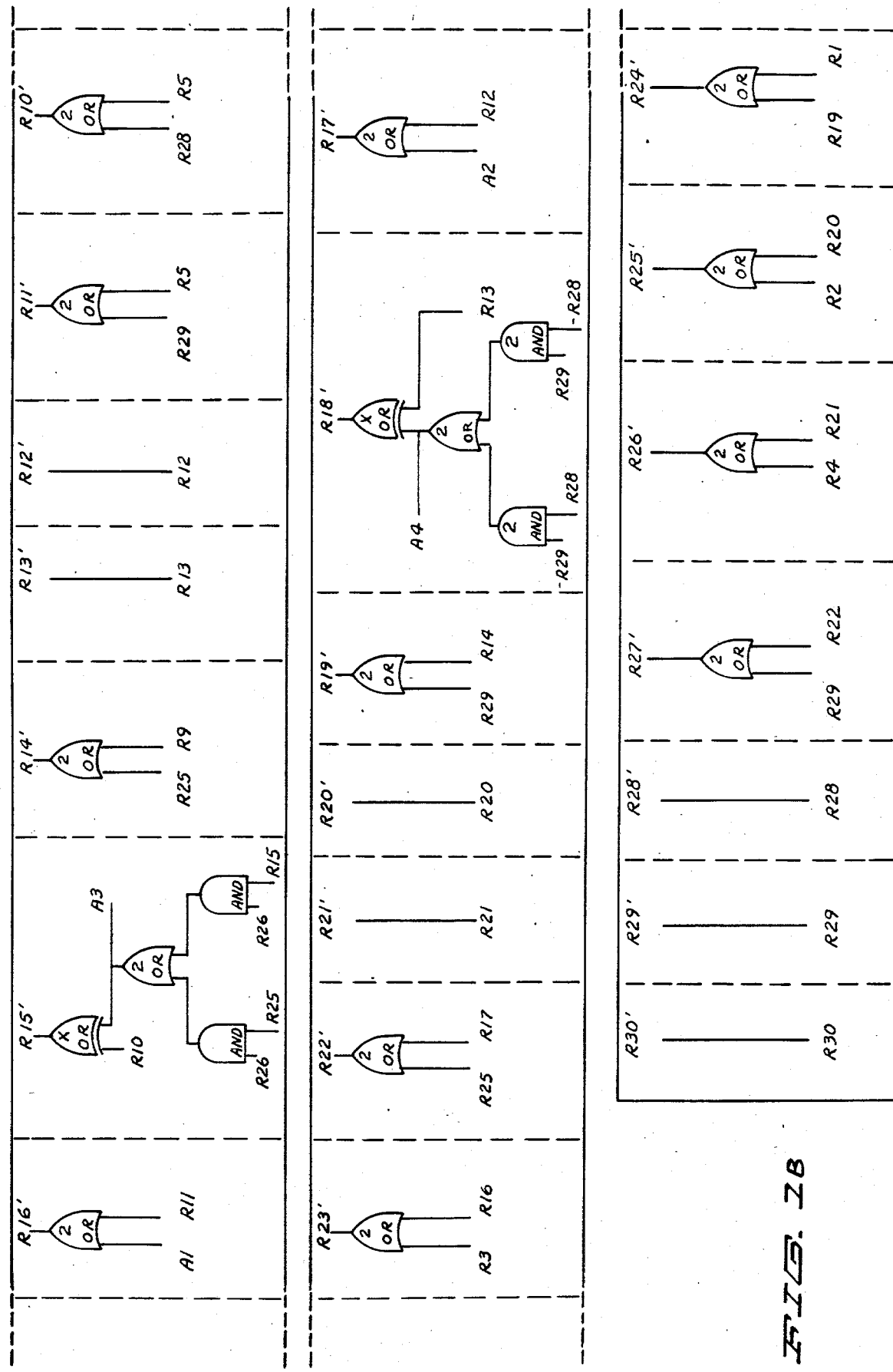
FIG. 2 is a second embodiment of the present invention showing another example to accomplish the work of a shift register having a multiple shifts, and is comprised of FIGS. 2A, 2B, and 2C covering three sheets of drawing.

This invention uses Equation (1) only as a point of departure. In the following, Equation (1) remains intact in syntax but the interpretation is changed from the normal arithmetic to that of an appropriate finite field in order to provide a hardware implementation for ultra-high speed (parallel) generation of random pseudo numbers.

Finite field multiplication were described in the context of a multiplier via transform in U.S. Pat. No. 4,216,531, issued Aug. 5, 1980, to one of the co-inventors of the present application. Over certain finite fields, a multiplier can take advantage of a transform network for both input operands and a similar network to again inversely transform the multiplied output back to a normal operand once the intermediate product is obtained in the transformed representation. The present invention involves the use of related techniques to those described in this patent in order to implement a highly powerful pseudo-random number generator. The above-mentioned U.S. Pat. No. 4,216,531 is hereby incorporated by reference.

In this context, the pseudo-random numbers $Z_{n+1}$ and $Z_n$ as well as the multiplicant b in Equation (1) are viewed as elements of the associated finite field defined by M. All these bit patterns represent polyomials in dummy x with each bit being the coefficient of a corresponding powerf of x. On an s-bit computer, the degree of the polynomial in x is $s-1$. When we label the index for each bit from the least significant position up onward, we can take the index as the power of the dummy x. Thus if the multipliant b happens to be in the following bit pattern $$b_{s-1}b_{s-2}b_{s-3}\ldots b_3b_2b_1b_0$$

we shall visualize that b can be the following polynomial.

$$b_{s-1}x^{s-1}+b_{s-2}x^{s-2}+\ldots+b_2x^2+b_1x^1+b_0x^0$$

On the other hand, M is a generatig polynominal of degree s so that through modulo M we are really manipulating the equivalence classes mod M of polynomials. The usual rules for polynomial addition and multiplication apply except for the following. The addition of coefficients is now modulo 2, corresponding to the logical operation XOR. For multiplication, we shall first get an intermediate resultant of degree $2s-2$ and then have it reduced modulo M to yield the final product in s bits again. As is immediately clear, any power of b like the following $$b, b^2, b^3, \ldots$$

will be precisely the s-bit pattern. So will be the pseudo random number $Z_{n+1}$ resulting from the multiplication by b mod M. In this way, the finite field of interest is therefore specified by M, often a primitive polynomial. Computing ahead to find $Z_{n+k}$ from $Z_n$ using $b^k$ directly is now possible.

At a quick glance, it might seem that the finite field operations needed for Equation (1) could be just as involved, if not even more, because of the reduction modulo M. In fact, such is the case if one does not take any shortcut. U.S. Pat. No. 4,216,531 shows how a multipliation mod M, in a finite field can be implemented via a proper transform so that the final reduced product is readily attainable within only a few levels of logical operations.

The patent shows the following system. First, transform both multiplicants from their representation in $s-1$ degree polynomials in dummy x to polynomials in $s'-1$ degree in x', where $2^s-1$ is divisible by s' which is slightly larger than s, and the s'th power of x' mod M turns out to be the unity in the finite field. Then, perform the multiplication of the transformed multiplicants represented in polynomials in dummy x'. Since $x'^{s'}=1$, and the reduction necessary in the x'

$$x'^{s'+1}=x', x'^{s'+2}=x'^2, x'^{s'+3}=x'^3,\ldots$$

representation involves only a proper shuffle. Having obtained the product in s' bits of x' representation, an inverse transform is performed to bring the intermediate product back to a representation in s bits for a polynomial of $s-1$ degree in dummy x.

Figure 4:
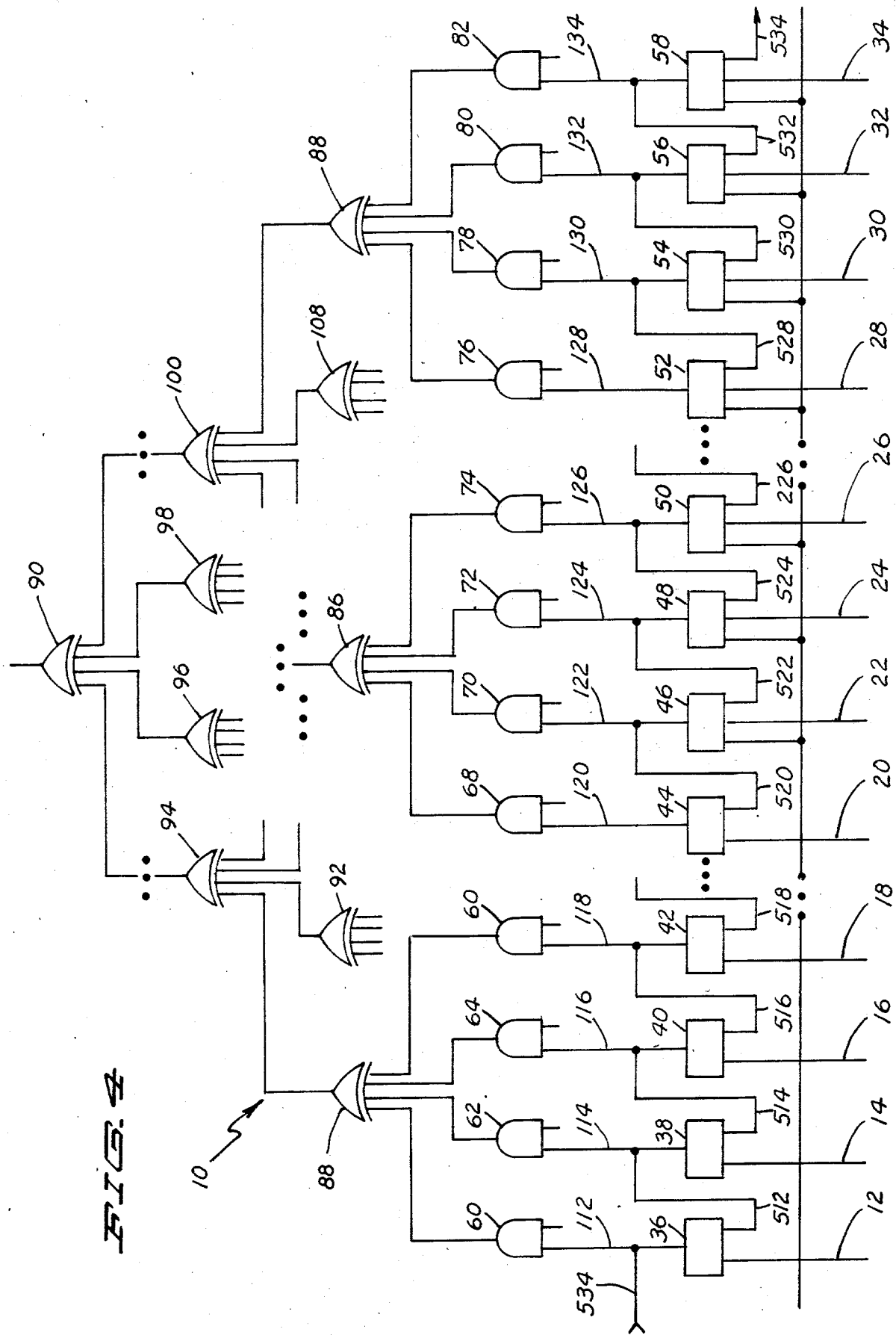
FIG. 4 is a schematic of an embodiment of the present invention showing the production of bits in the result of multiplication over the finite field. This forms the fundamental block in building up the ultra high speed parallel generation of PRN's economically.

In this way, the multiplication mod M in the finite field consists of two separable parts. It is fair to consider the multiplication of the transformed multiplicant in the x' representation as an internal part, invisible to user, for the convenience of implementation only. The other part is then the transform and/or its inverse, much in the position of an interface between the internal multiplication part and the outside world that is normally seen by the user. FIG. 4 is a layout of the internal multiplication part for one single bit of the intermediate product. With enough copies of the multiplication slice, the product of all bits can be simultaneously realized in parallel. However, connections are also included to enable one such slice alone to sequentially yield bits of the product in a systolic manner to save hardware, when time is not a critical element.

Referring now to FIG. 4, a systolic multiplier 10, according to the present invention, is shown. The transformation from the s bit x representation to the s' bit x' representation as well as the transformation back is shown with the T symbol in FIGS. 3, 5 and 6. All of the transformed bits are input on input lines 12, 14, 16, 18, 20, 22, 24, 26, 28, 30, 32, and 34 as shown in the multiplier sections. The left group of four bits and the right group of four bits are shown to show how the edges of the operand are treated, while the middle group of four bits shows how all of the middle bits of the operand are treated. The breaks in the diagram are to indicate that this structure can be used for all size operands according to whatever expansion of operand size is required. All of the input lines, 12 through 34, are input via register positions 36, 38, 40, 42, 44, 46, 48, 50, 52, 54, 56 and 58. They continue thru lines 112, 114, . . . 134 to meet the second operands. The second operand has its bits input into AND gates 60, 62, 64, 66, 68, 70, 72, 74, 76, 78, 80 and 82. The output of all AND gates 60 through 82 is input into exclusive OR gates as shown. In particular, exclusive OR gate 84 performs an exclusive OR on the four inputs 60, 62, 64 and 66. Exclusive OR gate 86 performs an exclusive OR function on inputs from AND gates 68, 70, 72 and 74. Finally, exclusive OR gate 88 performs an exclusive OR function on input 76, 78, 80 and 82. Other exclusive ORs shown in the array form perform successive exclusive OR functions on the operand bits to finally provide a single bit as an output from exclusive OR gate 90, representing a single bit of the output operand. Exclusive OR gates 92, 94, 96, 98, 100 and 102 are arranged in array form to show that the structure produces an exclusive OR function on the input bits in order to produce the single output bit from exclusive OR gate 90. A similar array structure exists for each bit of the output operand. Thus, FIG. 4 provides what is referred to as a single slice for one bit of the output operand.

To obtain all s' bits of intermediate product simultaneously, one can employ s' slices of such structure to function in parallel. For s' to be on the order of $64 = 4^3$, one machine cycle is sufficient for this interim multiplication. In the interest of total economy we may employ only one single such slice to get s' bits of result. In this case, the input operand bits of a are fed only initially into the registers 36–58 thru lines 12–34. They will then proceed just as described above and yield a bit of product in that machine cycle. In the second cycle, the lines 12–34 are disabled and the content of registers 36–58 is cyclically shifted leftward thru lines 512, 514, . . . 534 and the signals proceed in the above mentioned manner to generate a second bit of product. This process can continue until all the s' bits of product are pumped out in s' cycles systolically. A trade-off in between is to use Ceiling(s'/i) slices to perform the multiplication in i cycles. A systolic counter is then required to control the progress as shown in detail in FIG. 5.

It should be quite natural now to perceive that a finite field multiplication complex is created to carry out the multiplication mod M between the multiplicant b and the previous nth pseudo random number $Z_n$ to generate a new $n+1$st pseudo random number $Z_{n+1}$. Recognizing the recursiveness inherent in the pseudo-random number sequence, only the internal multiplication complex in FIG. 4 is needed at each generation. The transform back and forth to interface with the s-bit world is not needed each time for the multiplication mod M except initially. Elements of the finite field are kept in s' bits internally and the interim multiplication is performed between the transformed b' and $Z'_n$. Needless to say, the closer s' is to s the better, preferably $s' = s + 1$ when the amount of hardware necessary to realize the internal multiplication complex is at its minimum.

The multiplicant b in the generation process can be, and is in fact usually, fixed for the algorithm and therefore hardwired within FIG. 4 as a stored constant. In this case, the multiplier is linked to the holding register only for the previous pseudo-random number as input to generate the next one. Alternatively, a variable multiplicant b may be desired for flexibility and/or generality. In the latter case, however, a transform is required to receive the multiplicant b to convert the s-bit b into s'-bit b' for subsequent multiplications. Similarly, the very initial content of the holding register can also be loaded from the CPU and then a transform from s-bit to s'-bit is required as an interface. This is more important to the application for encryption where sometimes PRN's of a selected skipping is desired rather than the complete sequence. The transformation from the s bit x representation to the s' bit x' representation as well as the transformation back is shown with the T symbol in FIGS. 3, 5 and 6.

The multiplication complex can also be described by taking the multiplicant b, the dummy x itself only or its low power $x^q$. When $q = 1$, the random number generator is reduced to a feedback shift register. The feedback configuration of the shift register is determined by M and a shift toward the high order bit position is mathematically a multiplication, by x, of the polynomial originally in the feedback shift register. The feedback triggered by the occurrence of overflow while shifting accomplishes just the reduction mod M. This oversimplified set up has been widely practiced as prior patents reflect but the outcome is not very satisfactory.

Figure 2C:
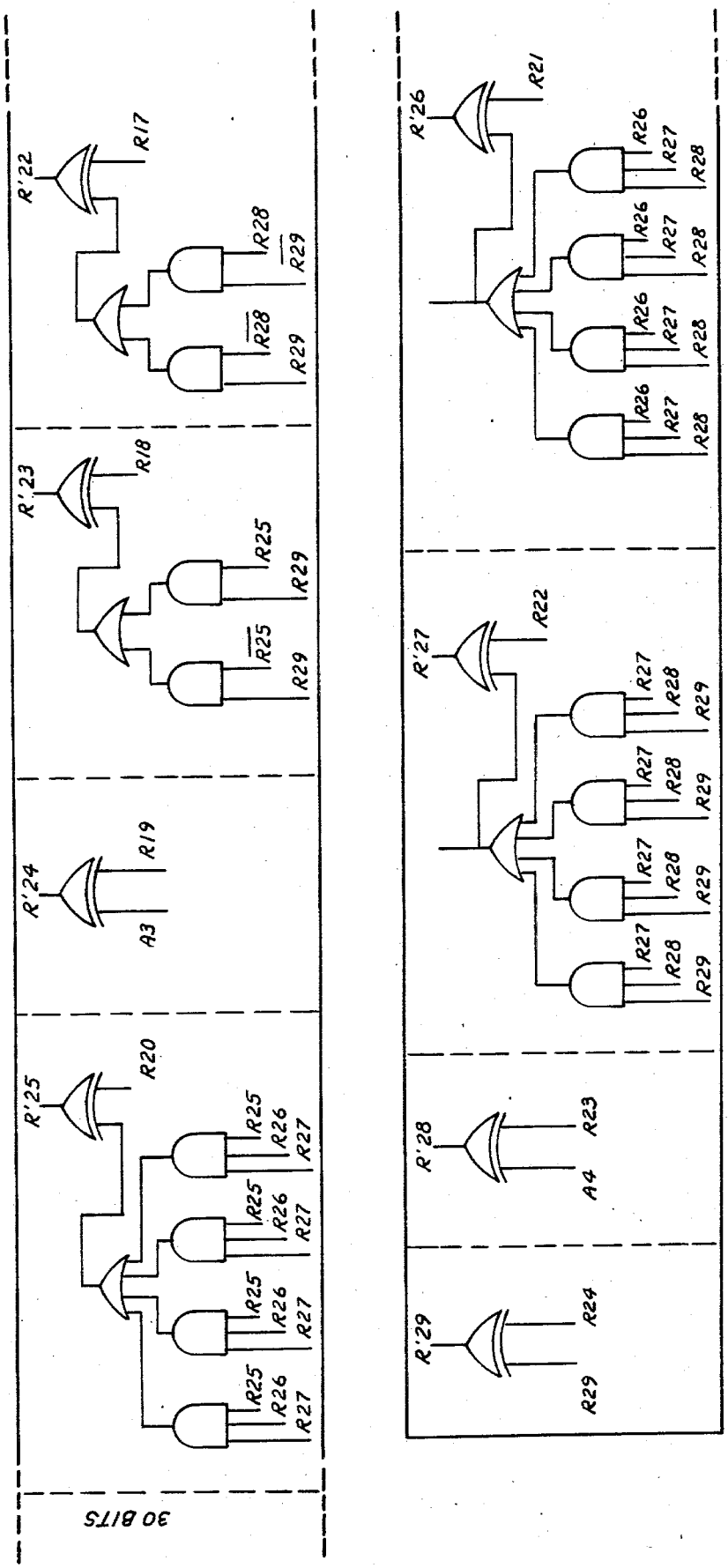

In a feedback shift register, the number q of shifts has to be larger than 3 to provide any good measure of randomness. Though $q = 4$ seems to serve reasonably well, $q = 5$ provides noticeable improvement for some applications and there is no significant gain further for the number q of shifts somewhat greater than 5. Conceivably, one can wait for these 5 shifts sequentially thru the feedback shift register to obtain a pseudo random number of certain quality when time in 5 machine cycles is not critical. With a small number of shifts, like 5, to shift however, a combined feedback network can be realized in a single operation within one machine cycle. In light of the commonality of the 32-bit word computer, FIGS. 1 and 2 show the network configurations that in one single operation can accomplish the work of a $q = 5$ shift operation to generate pseudo-random numbers of 31 bits and 30 bits, as examples. FIGS. 1 and 2 demonstrate a basic implementation to yield reasonable quality pseudo-random numbers quickly when too high a degree of sophistication of PRN is not too critical.

Referring now to FIG. 1 each output bit position of the shift register for a new PRN is shown using the notation R0', R1', R2', etc. For example, using the particular generating polynomial which controls the shift process of FIG. 1, input bits R25, R26 and R27 of the previous PRN, are directly connected to as R0', R1' and R2' for a 5 iteration shift. However, to derive output R3', input bits R25, the inverse of input bit R29, the inverse of input bit R25 and input bit R29 must be coupled to AND gates 150 and 152 as shown. The output of AND gates 150 and 152 is coupled to OR gate 154, which produces output bit R3'. Similarly, AND gates 156, 158, 160 and 162 produce an AND of the three input bits as shown in each case, and a 4 input OR gate 164 produces output R4'. Thus, the remainder of the figure is self-explanatory using standard symbols for AND gates, OR gates and XOR gates, where input bits are noted with the register position number and output bits are noted using the register number and the "prime" notation. Certain interconnection amongst positions are also necessary and those ard noted by the notation A-1, A-2, A-3, A-4, etc., where the like-numbered A connections are interconnected in the register. By use of the A notation, each bit position of the register may be shown as a simple stand-alone logic circuit. FIG. 2 uses similar standard logic symbols and imput/output notation to show the configuration for a 5 iteration shift using 30 bits of register and a particular characterizing feedback polynomial. Although the logic involved in the embodiment shown in FIGS. 1 and 2 is more complex than that of a single shift feedback register, implementation can be accomplished with existing technology with comparable hardware which is not significantly more complex.

Networks like the one in FIG. 1 and 2 can be prepared for pseudo-random numbers of any width. Such networks are really the multiplication complex for the case when the multiplicant b possesses only one single non-zero bit, namely $b_5$. No transform is needed here and multiplication is essentially the same as that realized by shift registers. In many applications, the pseudo-random numbers generated in this way are good enough. The only thing to be desired here is the parallelism that shall follow now for higher speed generation.

Referring now to FIG. 3, there is an array of k registers 202, 204, 206 up to 208 and 210 which are already occupied by k consecutive pseudo random numbers in the sequence, $$Z'_n \, Z'_{n+1} \, Z'_{n+2} \ldots Z'_{n+k-2} \, Z'_{n+k-1}$$

There is also an array of k multipliers 212, 214, 216, 218 and 220 which are identical copies composed of slices of FIG. 4 Choose, for the multiplicant, the k-th power of b' for each of the multiplication complexes. This array of multiplication complexes produces the next k consecutive pseudo-random numbers in the sequence and back into the array of k registers simultaneously as $$Z'_n * b'^k = Z'_n * b' * b'^{k-1} = Z'_{n+1} * b'^{k-1}$$
$$= Z'_{n+2} * b'^{k-2} = \ldots$$
$$= Z'_{n+k-1} * b'^1 = Z'_{n+k} \bmod M$$
$$Z'_{n+1} * b'^k = Z'_{n+k+1} \bmod M$$
$$\ldots$$
$$Z'_{n+k-2} * b'^k = Z'_{n+2k-2} \bmod M$$
$$Z'_{n+k-1} * b'^k = Z'_{n+2k-1} \bmod M$$

This means that a pseudo-random numbers vector can be generated truly in parallel with a segment of k elements simultaneously at one time if there are k copies of hardware, each is equipped with a full multipliers of s' slices.

Figure 5:
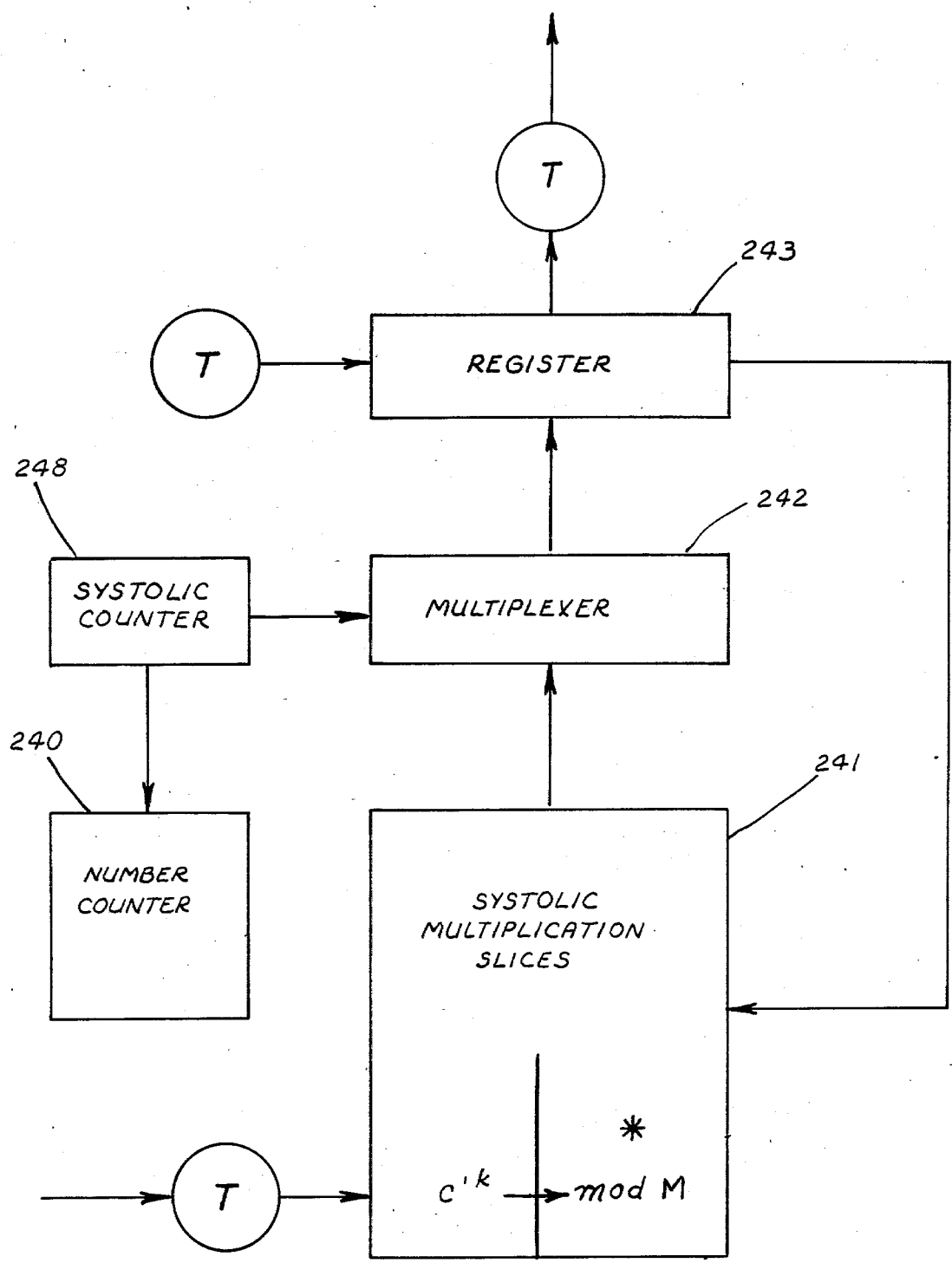
FIG. 5 shows the use of systolic multiplier to reduce cost according to another embodiment of this invention.
Figure 8:
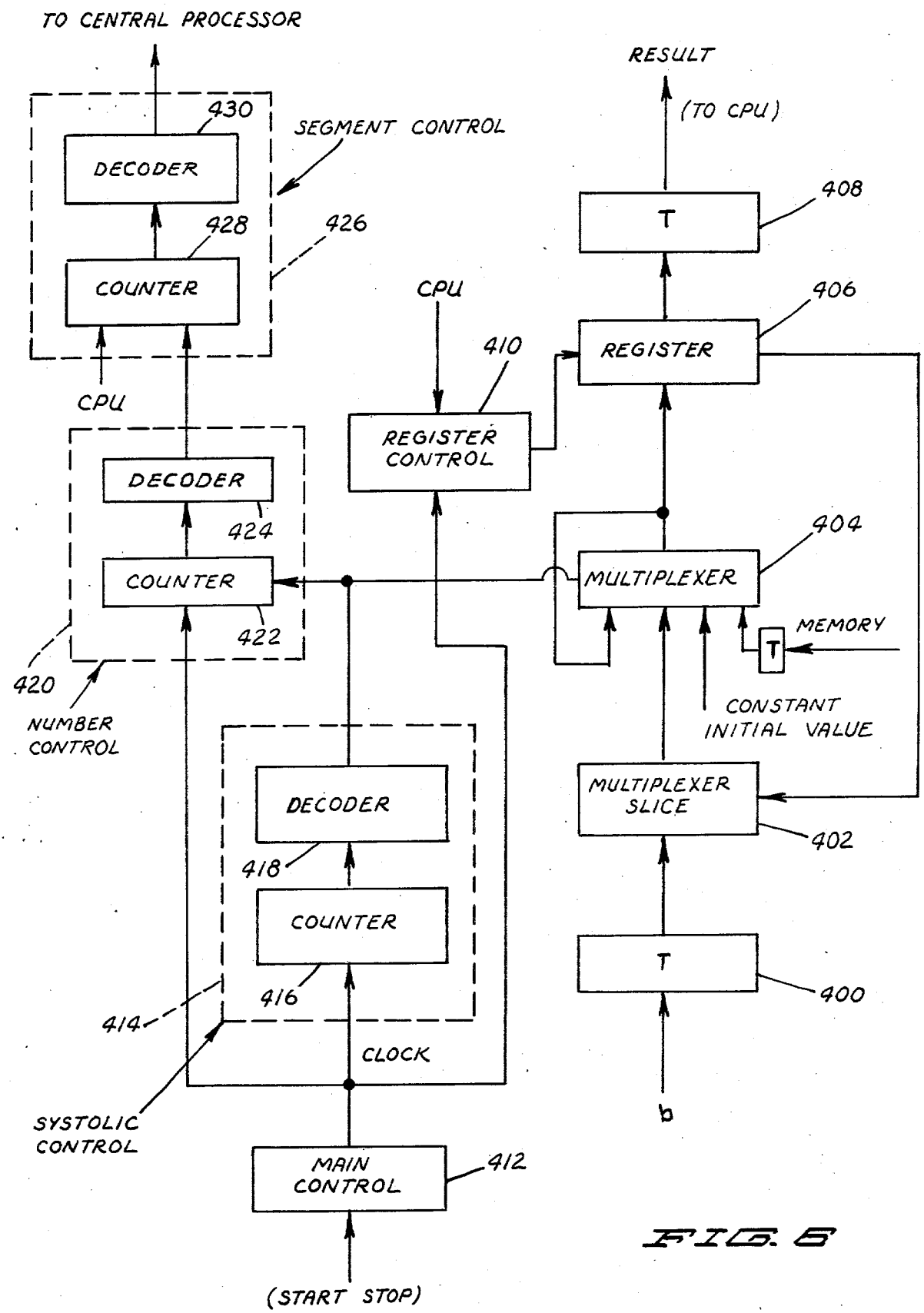

Note that the parameter k is arbitrary and is therefore to be determined according to other practical considerations. The larger k is, the faster the generation of the pseudo-random numbers but the more hardware called for, and the more costly. The performance and price trade-off is therefore a factor to be balanced. On the other hand, the all-out parallel implementation with the replication of k copies of identical hardware can also be designed with some flavour of pipeline architecture where a number counter is then called for to control the progress within the k pseudo random numbers segment. This way, the hardware requirement may be somewhat lowered. In FIG. 5, we show how one copy of FIG. 3 is configured with a systolic multiplier.

In the case where the multiplicant $b'^k$ can be fixed for the algorithm but not by the user, and can be hardwired into the multiplication complex, we would again look for some good multiplicant $b'^k$ that contains only a few non-zero bits in its x' representation so as to reduce the hardware required of the multiplication. This effort of seeking multiplier will have some effect on k. For such $b'^k$ with only a few bits, the number of AND gates in FIG. 4 is reduced to only this few, as few as 2, and much fewer than s'.

In each multiplication to complete the operation in one single machine cycle, we need s' copies of the multiplication slice shown in FIG. 4 to generate all s' bits of product in parallel. If time is not too critical an element and we can afford to take i machine cycles to generate each pseudo random number from a multiplication, a number ceiling of s'/i the smallest integer larger than or equal to s'/i, of copies of multiplication slice will be sufficient along with some proper control such as a systolic counter as well as a multiplexer in FIG. 5.

This consideration of slowing down the generation speed for saving the hardware runs into no conflict with the total pipeline implementation. In fact, this all out systolic implementation of the multiplication complex can be just equally applicable to the parallel generation of pseudo random numbers as sketched in FIG. 6 for pipelined architecture of vector computer for only one PRN per pipe per machine cycle.

As shown in FIG. 6, a pseudo-random number vector requires additional components beyond that s' shown in FIG. 5 as follows:

a segment counter 426 for counting sections of the vector, a register control 410 for controlling the output register 406, a pulse generator or clock signal from main control 412 for sequencing all events in order, and a main control 412 for controlling the flow of random numbers.

Referring now to FIG. 6, an input transform network 400 is coupled to a multiplication slice 402 like that shown in FIG. 4. The multiplication slice output is connected to a multiplexer 404, which in turn is connected to a register 406. The output of register 406 is connected to an output inverse transform network 408. The transform network 400 and the output inverse transform networks 408 convert the input number into the internal representation of s' bit polynomial in dummy x', and, in turn, once the random number is calculated back, from the internal representation to the conventional format of s bit polynomial in dummy x. Multiplexer 404 takes the particular operand bits generated by multiplication slice 402 and directs those bits to the appropriate bit positions in register 406. A register control 410 controls the gating of operands into and out of register 406 as the register is filled up from the multiplexer. A main control 412 controls the beginning and ending of the random number generation process, as the result of control signals from a central processor unit. The main control 412 is connected to a systolic control 414, which controls the register control 410 for the generation of particular random numbers generated by multiplication slice 402. The systolic control 414 consists of a counter 416 and a decoder 418, which counts the number of iterations performed by multiplication slice 402 and creates a new output bit from decoder 418 to be coupled to the multiplexer at the same time the multiplication slice 402 produces a new output bit. A number control 420 consists of a counter 422 and a decoder 424 which produces a count indicative of the number of particular fleet random numbers generated in register 406. In vector operation, number control unit 420 will produce a number of sequentially ordered random numbers to form a complete vector or string of random numbers. Finally, an additional level of counting in a segment control unit 426 has an additional counter 428 and decoder 430 for establishing the number of vector segments produced.

What is claimed is:

1. A non-recursive pseudo-random number generator comprised of:

input means for generating a first finite field binary operand from an input binary operand, a register connected to said input means for storing said first finite field binary operand, means for providing a second finite field binary operand to be multiplied with said first finite field binary operand stored in said register, a plurality of AND gates connected to receive individual first finite field binary operand bits from said register and said second finite field binary operand bits from said means for providing a second finite field binary operand to produce output partial product bits representative of the bit-by-bit multiplication of said first and second input finite field binary operands, exclusive OR means connected with the outputs of said AND gates for computing an exclusive OR function for all bits of said first and second finite field binary operands and for producing a single output bit which represents a particular bit of the output finite field binary operand forming the product of the input binary operands, where each bit of said output product binary finite field operand is generated in the same manner, a product storage register, a multiplexer having an output connection to each bit position of said product storage register, and a single input connection connected to the output of said exclusive OR means, a systolic counter connected to said multiplexer for controlling said multiplexer to shift its input-output connection by one bit position as each product bit is produced, and a number counter to produce an output count as each new random number is formed.

* * * * *